Figure 1:
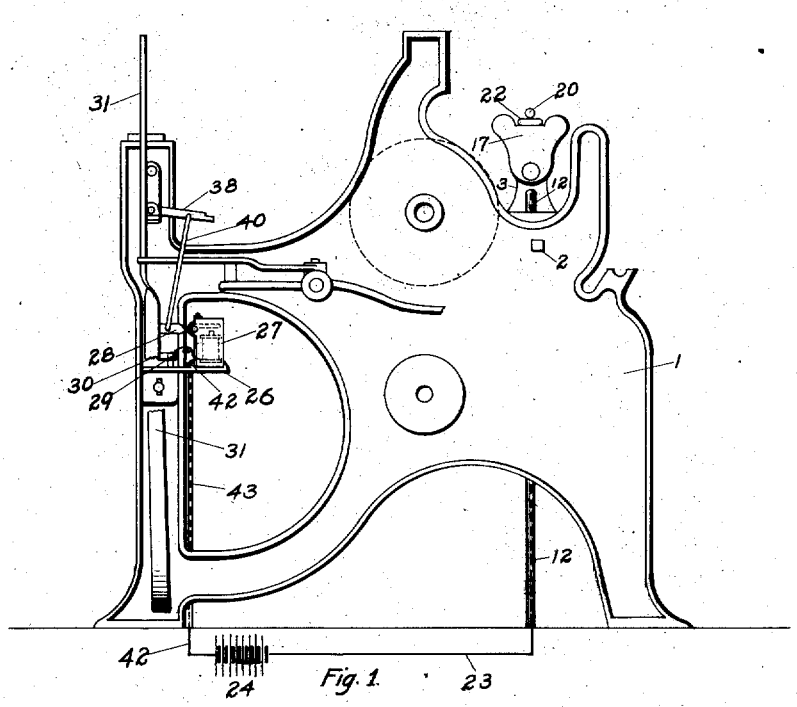

No. 12,481. REISSUED MAY 15, 1906.

J. COLDWELL & C. G. GILDARD.

STOP MOTION FOR LOOMS.

APPLICATION FILED DEC. 8, 1905.

2 SHEETS—SHEET 1.

Witnesses

Agnes B. Hudson

George H. Rogers.

Inventors.

Joseph Coldwell,

Christopher G. Gildard

By Geo. L. Roberts & Bro.

Attorneys

No. 12,481. REISSUED MAY 15, 1906.

J. COLDWELL & C. G. GILDARD.

STOP MOTION FOR LOOMS.

APPLICATION FILED DEC. 8, 1905.

2 SHEETS—SHEET 2.

Witnesses

Agnes B. Hudson

George H. Rogers

Inventors

Joseph Coldwell,

Christopher G. Gildard,

By Geo. L. Roberts & Co.

Attorneys

UNITED STATES PATENT OFFICE.

JOSEPH COLDWELL AND CHRISTOPHER G. GILDARD, OF SOUTH SWANSEA, MASSACHUSETTS, ASSIGNORS TO THE COLDWELL-GILDARD COMPANY, A CORPORATION OF MASSACHUSETTS.

STOP-MOTION FOR LOOMS.

No. 12,481. Specification of Reissued Letters Patent. Reissued May 15, 1906.

Original No. 747,856, dated December 22, 1903. Application for reissue filed December 8, 1905. Serial No. 291,002.

*To all whom it may concern:*

Be it known that we, JOSEPH COLDWELL and CHRISTOPHER GILES GILDARD, citizens of the United States, residing at South Swansea, in the county of Bristol and State of Massachusetts, have invented new and useful Improvements in Stop-Motions for Looms, of which the following is a specificaion.

Our invention relates to improvements in electrically-operated stop-motions for looms, the same having specific reference to improvements of certain details embodied in prior Letters Patent granted us in this class of inventions and dated November 21, 1899.

Our first object in view is to improve the contact-bar, (heretofore termed the "contact-roll,") whereby it is adapted to more positively establish an electrical contact or circuit with any one of the drop-bars upon the breaking of a warp-thread, to obviate the necessity of employing a roll for this purpose and also its attendant wiper, and finally to provide a convenient means for supporting the same.

So far as the above-enumerated objects and advantages are concerned the invention consists in a contact-bar having one or a plurality of contact-surfaces, the one herein illustrated and preferred being of triangular shape in cross-section, but which may be of any other shape that will present an inclined surface or surfaces to and down which the drop-wires may be slid and be deflected so as to thereby increase their contact area therewith, and whereby also the same is designed to successfully shed dust and other foreign deposits that ordinarily occur and which have heretofore been caught, retained, and required to be removed at intervals.

Our second object is to provide a convenient means for retaining the drop-wires in position upon the warp-threads and preventing the said drop-wires from being accidentally thrown off by the beat of the loom in the event of one or more of the warp-threads becoming slack, then suddenly taut; also, to adapt such device for ready application or removal or to be manipulated by throwing to one side without removal for the purpose of giving immediate and ready access to the warp-threads and drop-wires.

The above objects we attain by employing a guard-strip which is preferably, though not necessarily, of elastic webbing, the same being stretched between the sides of the loom or its auxiliaries immediately over but out of contact with the upper ends of the drop-bars, the ends of the said strips being either permanently or preferably temporarily supported.

Other objects and advantages of minor importance will be hereinafter pointed out.

Figure 2:
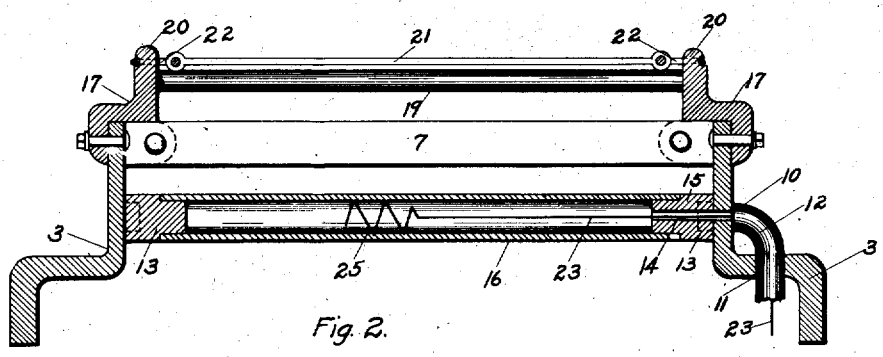
Figure 3:
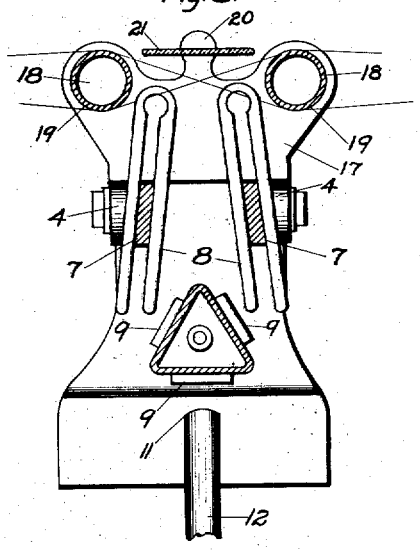
Figure 4:
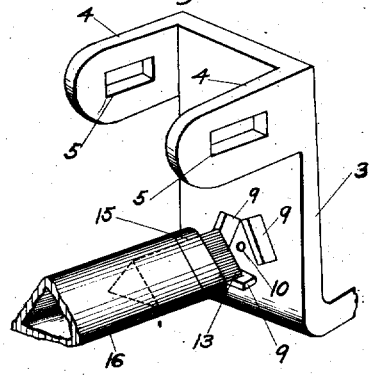
Figure 5:
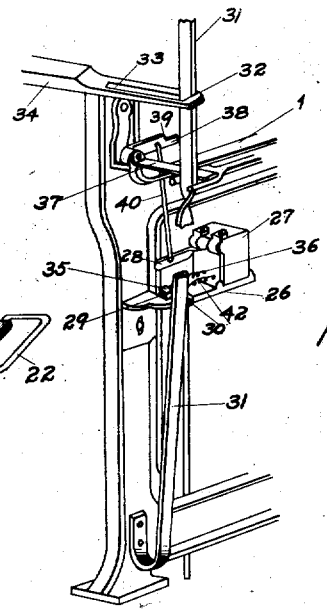
Figure 6:
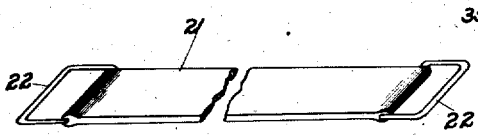

Referring to the drawings, Figure 1 is a side elevation of a loom-frame having a stop-motion embracing our invention. Fig. 2 is a longitudinal sectional view of the auxiliary frame, the line of section being between the lease-rods. Fig. 3 is a vertical transverse sectional view of the same. Fig. 4 is a detail in perspective of one of the supporting-brackets for the contact-bar, the insulating-support for said bar, and the contact-bar itself, these parts being separated. Fig. 5 is a detail in perspective of the drop-bar guard-strip. Fig. 6 is a detail in perspective of the stop or guard-strip.

Similar numerals of reference indicate similar parts in all the figures of the drawings.

The side frames 1 of the loom are of the usual construction, and to the same are bolted, as at 2, the inwardly and upwardly disposed brackets 3, at the upper ends of which are pairs of inwardly-disposed parallel ears or lugs 4, slotted, as at 5, to receive adjusting-bolts 6, by means of which the parallel pair of circuit-bars 7 are supported. These circuit-bars are merely metallic strips or rods of suitable thickness to receive and guide the bifurcated drop-bars 8 and are so disposed that their lower edges diverge slightly, as shown.

Each of the brackets 3 has cast upon its inner face below and between the circuit-bars a group of lugs 9, the same being arranged in the form of a broken triangle, and therefore forming a socket. Within this triangle one of the aforesaid brackets is provided with a hole or perforation 10, and from out the same through a similar hole or perforation 11 and down through the floor extends an insulating-wire-conducting tube 12. The triangular sockets are occupied by the outer ends of trunnions 13, one of which is hollow or bored, as at 14, in line with the tube 12 and each of which is provided at its middle or at an intermediate point with an enlargement or boss 15. The inner reduced ends of these trunnions, which, it will be understood, are made of suitable insulating material, enter the opposite ends of a hollow contact-bar 16, which is preferably made of copper or any other electrical conductor and which in the present instance is triangular in cross-section. This bar, it will be seen, comprises two inclined sides or surfaces, and it is to be understood that any construction can be employed which will produce in such bar one or a plurality of inclined surfaces, the same occurring directly below and in line with the superimposed circuit-bars. So, also, is the manner herein shown for supporting and insulating the contact-bar a mere detail subject to variation.

Securely bolted to the main brackets 3 at their upper ends, and therefore forming extensions thereof, are the two lease-rod brackets 17, the same being widened at their upper ends and each provided with, in this instance, a pair of rounded lugs 18, which receive the tubular ends of a pair of lease-rods 19, alternately over and under which the warp-threads are passed and designed to run in the usual manner.

Between the lease-rods and above the same the upper ends of the lease-rod brackets have formed thereon lugs 20, the objects of which will presently appear.

The bifurcated form of drop-bar, as shown in Fig. 3, is preferably employed, although any bifurcated form can be used, such form being preferably employed on account of the ease with which it can be applied to the warp-threads. These drop-bars are located between the lease-rods, where they avoid chafing and are out of the way.

It sometimes occurs that a warp-thread becomes suddenly slack and again taut, which will throw the drop-bar supported thereby astride the circuit-bar therebelow off the warp-thread, and hence out of operative position with relation to the contact-bar. It is to prevent this accident that we employ what we term the "drop-bar guard-strip." This strip (designated as 21) is simply a piece of elastic webbing terminating at its ends in eyes 22, designed in the present instance to removably engage with the two lugs 20 at the upper side of the lease-rod brackets. Either or both ends of the guard may be removed or reëngaged, and the strip being elastic can be pushed aside to give immediate access to the drop-bars and warp-threads therebelow. Of course this guard need not be of elastic material and, as a matter of fact, may be of any material of sufficient flexibility or elasticity to permit its being stretched or sprung away from the drop-bars and give access thereto, also of any shape, and held in position in any desired manner so as to cover and protect the series of drop-bars employed and prevent their accidental disengagement with the warp-threads.

23 designates a circuit-wire which leads from the battery 24, preferably located below the flooring, or from any other source of electrical supply up through the tube 12, where it terminates within the contact-bar in a coil 25 or other form of contact, thereby establishing constant electrical connection with said contact-bar. A contact in the shape of a coil is preferably employed, as in case of breakage of the electrical conductor the same can be easily spliced or connected, a sufficient surplus for this purpose being secured by withdrawing a portion of the coil from the contact-bar.

In all other respects the invention is the same as fully explained in our previous patents and may be briefly explained as follows:

26 designates a bracket upon which is located a magnet-box 27, upon which is pivotally mounted an armature-lever 28. Upon the bracket is also located a stud 29, having a contact-spring 30, which is in electrical contact with the shipper 31 when in engagement with the notch 32, formed in the end of the slot 33 of the guide-plate 34. When the parts are in this position, it will be possible to complete the circuit by a drop-bar descending and contacting with the contact-bar, the current being carried thereto from the circuit rods or bars; but when the shipper is at the inner end of the slot of the guide-plate the circuit cannot be completed.

On the stud 29 is located a binding-post 35, and from it leads to the pole of the magnet within the magnet-box a circuit-wire 36.

37 designates the knock-off, 38 the gravity-latch, and 39 the notch or shoulder formed therein.

40 designates a wire connecting-rod between the latch and the armature-lever, so as to cause a unity of movement between the two. It will be obvious that if the magnet attracts the armature-lever, as when the circuit is complete, the armature-lever will rise at its outer end and elevate the latch into the path of the lay, where it is struck by the latter and, together with the knock-off, is forced forward, the latter striking the shipper and disengaging the same from the notch in the guide-plate, permitting the shipper to spring inward and operate the belt-shifter to stop the loom instantly and also to break contact with the contact-spring.

From the remaining pole of the battery or from other source of electrical supply leads an insulated circuit-wire 42, which passes to the magnet through the conducting-tube 43, the remainder of the circuit being completed through the metallic frame of the loom.

From the foregoing it will be observed that we attain all of the objects sought in a most convenient and economical manner.

Having described our invention, what we claim is—

1. The combination with a loom and a stop-motion therefor comprising a series of drop-bars supported upon the warp-threads of the loom, of an elastic guard-strip supported above and out of contact with the drop-bars and the warp-threads of the loom and designed to prevent an accidental throwing off of said drop-bars from said warp-threads and capable of being stretched to one side to give access to the drop-bars.

2. The combination with a loom and a stop-motion therefor comprising a series of drop-bars supported on the warp-threads of the loom, of an elastic guard-strip removably supported above and out of contact with the drop-bars and designed to prevent an accidental throwing-off of said drop-bars from the warp-threads.

3. The combination with a loom comprising brackets arranged for the support of its lease-rods, and above and between the latter provided with lugs, of a stop-motion for the loom comprising a series of drop-bars supported by the warp-threads thereof between the lease-rods, and a guard-strip arranged above and out of contact with the drop-bars and terminating in eyes engaging said lugs of the brackets.

4. In an electrically-operated stop-motion for looms, and in combination with an electrical circuit rod or bar, and drop-bars loosely embracing the same, a contact-bar, also in circuit, and having an inclined contact-surface free at its lower edges arranged in the path of and adapted to deflect said drop-bars.

5. In an electrically-operated stop-motion for looms, and in combination with a pair of electrical-circuit bars, and drop-bars loosely embracing the same, a hollow triangular contact-bar having its oppositely-inclined contact-surfaces arranged in the path of and adapted to deflect the drop-bars, and also in circuit.

6. The combination with a loom-frame, the main brackets supported thereby and provided with the lugs forming the broken triangular sockets, one of which latter has a perforation, a wire-conducting tube leading to the same and to the bottom of the loom, triangular insulating-plugs, one of which is hollow, seated in the sockets, a triangular contact-bar receiving the inner ends of the plugs, a source of electrical supply located at the foot of the loom or below the same, a circuit-wire leading from the same up through the tube and terminating in the triangular contact-bar in an electrical contact, of a pair of lease-rod brackets, circuit-bars below the same and supported by the main brackets, lease-rods carried by the lease-rod brackets, a series of drop-bars embracing the circuit-bars and adapted to be supported out of contact with the contact-bar by the warp-threads passing about the lease-rods, a knock-off mechanism, a magnet for operating the same, and an electrical connection between the source of electrical supply and the said magnet.

7. The combination, in a loom, a stop-motion therefor, comprising, a series of drop-bars supported upon the warp-threads of the loom, and an elastic guard-strip supported above the drop-bars and adapted to limit the upward movement of the drop-bars.

8. The combination, in a loom, of means for disposing the warp-threads thereof into opposite declining intersecting banks, a stop-motion embodied in the loom and comprising opposite series of drop-bars supported by the several threads composing said banks, and a yielding means located between the intersecting banks of warp-threads and the thread-disposing means for limiting the upward movement of said bars and capable of being drawn aside to expose said bars.

9. The combination, in a loom, of means for disposing the warp-threads thereof into opposite declining intersecting banks, a stop-motion embodied in the loom and comprising opposite series of drop-bars supported by the several threads composing said banks, and a yielding means common to both series of drop-bars located between the intersecting banks of threads and the thread-disposing means for limiting the vertical movement of said drop-bars and capable of being drawn aside to expose said drop-bars.

10. The combination, in a loom, means for disposing the warp-threads thereof into opposite intersecting banks, a stop-motion embodied in the loom, and comprising, opposite series of drop-bars supported by the several threads composing the said banks, and an elastic strip located between said dividing means and above the said drop-bars whereby the drop-bars of both series are limited in their upward movement.

11. The combination, in a loom, of means for supporting the warp-threads thereof, a stop-motion embodied in the loom and comprising a series of drop-bars supported by the several warp-threads, and a flexible strip secured at its opposite ends located above and adapted to limit the upward movement of the drop-bars and adapted to be drawn aside in order to give access to said drop-bars and permit of their removal from and replacement on the threads.

12. The combination, in a loom, of means for disposing the warp-threads thereof into opposite declining intersecting banks, a stop-motion embodied in the loom and comprising opposite series of drop-bars supported by the several threads composing said banks, and a flexible guard common to both series of drop-bars secured at its opposite ends and located between the intersecting banks of threads and adapted to be drawn aside from said drop-bars to give access to said drop-bars and permit of their removal from and replacement on the threads.

13. In warp stop mechanism for looms, the combination of a series of drop-bars supported upon the warp-threads, and a guard-strip attached at each end to the loom-frame and located above the series of drop-bars and across their line of movement transversely of the warp-threads, which guard-strip is adapted normally to prevent the drop-bars from being thrown from the warp-threads and also to be readily moved to one side of the line of drop-bars without detaching the end connections of the guard-strip from the frame.

14. In warp stop mechanism for looms, the combination of a series of drop-bars supported upon the warp-threads, and a guard-strip attached at each end to the loom-frame in a position to normally cover the upper ends of the series of drop-bars and prevent their accidental displacement from the warp-threads; which guard-strip is adapted to be readily moved from its normal position without disturbing its attachment to the loom-frame, and to be automatically returned to such position.

15. In warp stop mechanism for looms, the combination of one or more series of drop-bars supported upon the warp-threads and a cover for the upper ends of the drop-bars normally located above and in proximity to them, and attached at each end to the loom-frame, which cover is adapted to be thrown to one side, to give access to the drop-bars, and to be returned to its normal position, without removal from its connections with the loom-frame.

JOSEPH COLDWELL.
CHRISTOPHER G. GILDARD.

Witnesses:
NICHOLAS HATHEWAY, Jr.,
J. K. LANNING.